July 23, 1929. H. WAGENER 1,722,025

PROCESS FOR BRAZING COPPER ALLOYS TO IRON ALLOYS

Filed Oct. 16, 1926

INVENTOR.
Hans Wagener
BY Myron J. Dikeman
ATTORNEY.

Patented July 23, 1929.

1,722,025

UNITED STATES PATENT OFFICE.

HANS WAGENER, OF BERLIN-WILMERSDORF, GERMANY, ASSIGNOR, BY DIRECT AND MESNE ASSIGNMENTS, OF ONE-FOURTH TO HEINRICH MARZAHN, OF BERLIN-WILMERSDORF, GERMANY, ONE-FOURTH TO WILLIAM M. BARRY, OF DETROIT, MICHIGAN, AND ONE-FOURTH TO THEODORE C. BETZOLDT, MARVIN A. SMITH, AND FRANK J. CUSHING.

PROCESS FOR BRAZING COPPER ALLOYS TO IRON ALLOYS.

Application filed October 16, 1926, Serial No. 141,980, and in Great Britain December 24, 1925.

This invention relates to a process of brazing copper or copper alloy sections to gray iron or gray iron alloy sections, by means of a special flux and heat treating process.

The object of my invention is to provide a process for brazing two metallic sections of different metals possessing widely different melting points, securely and permanently together, and that is more expeditious and considerably cheaper than any process or method as used or applied at the present time.

Another object is to provide a brazing process that is readily adapted to effective application by unskilled workmen, and that is efficient and effective in producing solid, permanent brazed joints between copper and gray iron sections, or between any alloy of copper and gray iron sections.

A further object is to produce a special brazing flux or binder, adapted for application with this process that is effective when applied through a high heat treatment.

It is known that great advantages may be derived by combining sections of copper and sections of gray iron in the manufacturing of various mechanical parts, and especially where the mechanical parts are to be exposed to high heat temperatures, and a low coefficient of expansion is required. This is especially true of the piston construction as used in internal combustion engines, where great advantage could be derived by the application of a special piston having a copper head and a gray iron body, if the connecting joint between these two metals could be effectively and securely brazed together My process is equally as well adapted to the manufacturing of any mechanical part where the combination of copper and gray iron sections may be applied with brazed joints, such as the insertion of a copper section within a gray iron section, or where adjoining edges of copper and gray iron may require brazing together.

It is known that it is with great difficulty that two or more metals possessing widely different melting points, such as copper and gray iron, may be brazed together, and if accomplished at all it must be done by highly skilled workmen and under difficult conditions, and without any degree of security in the final results.

My process is especially adapted for brazing any section of copper to any section of gray iron where the shape of the connecting metal parts will allow a narrow intervening recess pocket interposed therebetween, sufficient for holding a small quantity of brazing flux therein, and capable of being subjected to a high heat treatment.

My process will best be understood by reference to the accompanying diagrammatic drawings which form a part of these specifications.

Similar parts on all drawings are marked by similar numerals.

Figure 1:
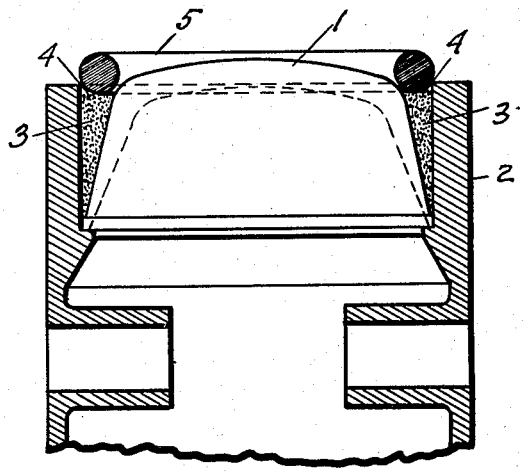
Fig. 1, illustrates the application of my process to brazing a copper piston head within a gray iron piston body.
Figure 2:
Fig. 2, illustrates the application of the process for brazing any copper section within any gray iron section.
Figure 3:
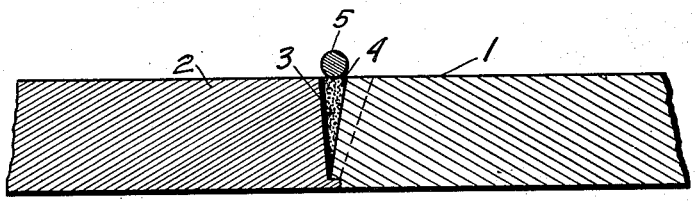
Figs. 3 and 4, illustrate the process as applied to the end joint brazing of a copper bar section to a gray iron bar section.
Figure 4:
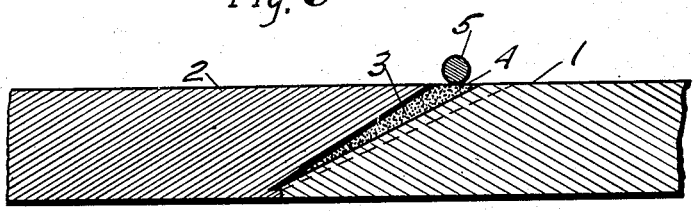

The use of the words "copper", and "gray iron", throughout this patent, include therein copper alloys and gray iron alloys also.

In preparing the copper and gray iron members —1— and —2— for brazing together, the design of the adjoining faces is material to the process for an effective brazing of the joint, and the adjacent faces —a— and —b— must be shaped and positioned relative to each other, so as to provide a narrow, deep, pocket recess —3— therebetween, said recess being closed at the bottom and sides for receiving a liquid brazing flux therein. This is easily accomplished as illustrated in the several sketches shown in the accompanying drawings, or the copper and gray iron sections to be brazed together may be placed in a convenient brazing frame, suitable for accomplishing the same result. It is also an essential requirement before placing the copper and gray iron sections —1— and —2— in position for brazing, that the latter be pickled by dipping in hydrochloric acid, or its equivalent, and thereafter placed together in a manner providing the narrow recess pocket —3— therebetween. Within the pocket recess —3— is placed a special flux and binding medium —4—, comprising chemically pure iron and copper both in the powdered form, and powdered borax, all thoroughly mixed with pure water, in quantity sufficient to form a liquid flux paste thereof. The preferred composition of the liquid flux paste being as follows:

Powdered iron_____ 1 part, by measure.
Powdered copper_____ 1 part, by measure.
Powdered borax_____ 6 parts, by measure, the total consisting of 8 parts, and pure water in an amount to make the above ingredients into a liquid paste. The term "part" meaning unit of measure, and expresses only a relative proportion of ingredients used therein. The liquid flux paste is placed within the pocket recess —3—, practically filling same full. In case the copper and gray iron sections —1— and —2— are of a design that will not rigidly hold them in the required position for forming the recess —3— by their own construction, they may be placed in a convenient frame for holding the required position during the process. After the filling of the recess —3— with the flux and binding material as described in the above formula, the sections are then subjected to a high heat treatment, for example, by placing same in an upright position within an oven having a temperature of about 1000 degrees centigrade, the melting point of brass. After the copper and gray iron sections —1— and —2— have assumed the temperature of the oven, a piece of brass —5—, as a brass wire or rod, is placed over the pocket recess —3—, on the flux paste —4—, and the heating continued until the brass wire —5— melts. The melting point of the copper section —1— and the gray iron section —2— being higher than the oven heat temperature, while the melting point of the brass wire —5— is lower than the oven heat temperature, allows the brass wire —5— to melt quickly and without effecting the sections —1— and —2—. In the ordinary case of brazing a copper head within a gray iron piston body, it will require approximately one minute in time, or thereabout. The brass wire —5— when melted, will permeate the flux medium —4—, completely filling the recess —3—, and owing to the previous preparation of the metal sections and the flux, will unite with the walls —a— and —b— of the copper and gray iron sections in a particularly intimate manner, penetrating and combining with same. The sections should be immediately removed from the oven as soon as the brass wire —5— is melted and allowed to cool slowly, and which will completely braze the metals together. It is essential that the parts be removed from the oven as soon as the brass wire —5— is melted, as the brass and the copper being nearly the same in their respective melting points, and the molten brass might affect the copper section and injure same.

This process may be accomplished easily by unskilled workmen, owing to the fact that the recess pocket —3— is predetermined by mechanical design of the copper and iron sections —1— and —2—, and the liquid flux paste medium —4— is also previously prepared and only requires application thereof to the joint, and the melting of the brass wire —5— intelligently indicates the time for removing same from the source of heat, for cooling.

It is apparent that my process, and the flux used therein is subject to various modifications without departing from the spirit of my invention. Very good results may be obtained by varying the proportions of the ingredients in the flux, between the following limits:

Powdered iron_____from ½ of one part to 10 parts.
Powdered copper_____from ½ of one part to 10 parts.
Powdered borax_____from 3 to 15 parts, all by measure.

The term "part", meaning any unit of measure as hereinbefore stated, and sufficient water is added to make the above combination of ingredients into a liquid paste.

The borax acting as a flux and binding material, may be replaced by any similar ingredient, as various composition of borax, or may be substituted by lead or ceiling paste such as is now obtainable on the commercial market for such purposes, or ground glass or certain forms of silicon may also be substituted for borax, the purpose being for forming a special binder acting with the fine powdered copper and iron of the composition, cementing and uniting all metals together, and any substance that will act as a substitute for the borax is included herein.

Having fully described my process, and brazing paste used therein, what I claim as my invention and desire to secure by Letters Patent is:

1. A process for brazing copper and gray iron sections together where the sections are provided with a pocket recess therebetween, the gray iron section first is treated with hydrochloric acid solution, the pocket recess between the parts is filled with a special brazing flux and binding material and the whole mass subjected to a high heat treatment nearly to the melting point of the copper section, and molten brass introduces within the pocket recess, permeating the brazing flux and completely filling the recess, followed by slowly cooling of the parts.

2. A process for brazing copper and gray iron sections together where the said sections are provided with a thin pocket recess therebetween, consisting of first pickling the gray iron with hydrochloric acid, then filling the entire recess between the copper and gray iron sections with a brazing flux comprising fine powdered copper and iron mixed with powdered borax and water, forming a liquid paste thereof, then subjecting the whole mass to a high heat treatment nearly to the melting point of the copper section, and introducing molten brass within the pocket recess joint by adding a brass bar thereon and continuing the heating process until the said brass bar melts, permeating the brazing flux and binder and completely filling the recess therein, followed by slow cooling of the mass until the molten section is hard.

In witness whereof I sign these specifications.

HANS WAGENER.